(12) United States Patent
West et al.

(10) Patent No.: US 9,440,231 B2
(45) Date of Patent: Sep. 13, 2016

(54) POLYMER MICROFLUIDIC BIOCHIP FABRICATION

(75) Inventors: Jason A.A. West, Pleasanton, CA (US); Jesse Thompson, Brentwood, CA (US)

(73) Assignee: FLUIDIGM CORPORATION, South San Francisco, CA (US)

( * ) Notice: Subject to any disclaimer, the term of this patent is extended or adjusted under 35 U.S.C. 154(b) by 847 days.

(21) Appl. No.: 12/673,192

(22) PCT Filed: Aug. 8, 2008

(86) PCT No.: PCT/US2008/072581
§ 371 (c)(1),
(2), (4) Date: Aug. 3, 2011

(87) PCT Pub. No.: WO2009/023547
PCT Pub. Date: Feb. 19, 2009

(65) Prior Publication Data
US 2012/0128548 A1   May 24, 2012

Related U.S. Application Data

(60) Provisional application No. 60/955,649, filed on Aug. 14, 2007.

(51) Int. Cl.
*B01L 3/00* (2006.01)
*G01N 30/00* (2006.01)
(Continued)

(52) U.S. Cl.
CPC . *B01L 3/502707* (2013.01); *B01J 2219/00605* (2013.01); *B01J 2219/00608* (2013.01); *B01L 2200/0636* (2013.01); *B01L 2200/0647* (2013.01); *B01L 2200/0668* (2013.01); *B01L 2200/0689* (2013.01); *B01L 2300/0816* (2013.01); *B01L 2300/0819* (2013.01);
(Continued)

(58) Field of Classification Search
CPC ........... B01L 3/5027; B01L 3/502707; B01L 2200/0689; B01L 2300/0816; B01L 2300/0887; B01L 2300/0819; B01L 2200/0647; B01L 2200/0668; B01L 2200/0636; C12Q 1/6837; G01N 33/54386; B01J 2219/00459; B01J 2219/005
USPC .................. 422/68.1, 502, 504, 507, 534
See application file for complete search history.

(56) References Cited

U.S. PATENT DOCUMENTS

| 7,223,363 B2 | 5/2007 | McNeely et al. |
| 7,229,538 B2 | 6/2007 | Tseng et al. |

(Continued)

FOREIGN PATENT DOCUMENTS

| CA | 2628791 | 7/2007 |
| WO | WO/2006/035228 | 4/2006 |
| WO | WO/2009/023547 | 2/2009 |

OTHER PUBLICATIONS

International Patent Application No. PCT/US2008/072581: International Search Report and Written Opinion dated Feb. 24, 2009, 11 pages.

(Continued)

*Primary Examiner* — Jennifer Wecker
(74) *Attorney, Agent, or Firm* — Emily M. Haliday; Weaver Austin Villeneuve & Sampson LLP

(57) ABSTRACT

Provided are microfluidic devices and methods for fabricating and bonding such devices. Also provided are kits for analyzing analyte-containing samples and for lysing cells.

23 Claims, 11 Drawing Sheets

COVER LID

INFRA-RED ABSORBING COATING

SERPENTINE DEVICE BASE

(51) Int. Cl.

| | | |
|---|---|---|
| B29C 45/03 | (2006.01) | |
| B29C 59/02 | (2006.01) | |
| B29C 45/00 | (2006.01) | |
| B29C 45/73 | (2006.01) | |
| B05D 5/00 | (2006.01) | |
| B32B 37/06 | (2006.01) | |
| G01N 33/543 | (2006.01) | |
| B29L 31/00 | (2006.01) | |

(52) U.S. Cl.
CPC ... *B01L2300/0887* (2013.01); *B29L 2031/756* (2013.01); *G01N 33/54386* (2013.01)

(56) References Cited

U.S. PATENT DOCUMENTS

| | | | |
|---|---|---|---|
| 7,604,775 B2* | 10/2009 | Pollock et al. | 422/408 |
| 7,743,928 B2* | 6/2010 | Crowley et al. | 210/433.1 |
| 2002/0123154 A1* | 9/2002 | Burshteyn et al. | 436/177 |
| 2002/0176804 A1* | 11/2002 | Strand et al. | 422/100 |
| 2003/0026740 A1* | 2/2003 | Staats | 422/102 |
| 2003/0175947 A1* | 9/2003 | Liu et al. | 435/288.5 |
| 2004/0040848 A1* | 3/2004 | Schnelle et al. | 204/450 |
| 2004/0056006 A1* | 3/2004 | Jones et al. | 219/121.64 |
| 2004/0086424 A1* | 5/2004 | Schembri | 422/58 |
| 2004/0087033 A1* | 5/2004 | Schembri | 436/180 |
| 2004/0101442 A1 | 5/2004 | Frechet et al. | |
| 2004/0142484 A1* | 7/2004 | Berlin et al. | 436/171 |
| 2004/0145086 A1 | 7/2004 | Yusa | |
| 2004/0241049 A1 | 12/2004 | Carvalho | |
| 2004/0253141 A1* | 12/2004 | Schembri et al. | 422/58 |
| 2005/0009101 A1* | 1/2005 | Blackburn | 435/7.1 |
| 2005/0095602 A1 | 5/2005 | West et al. | |
| 2005/0112588 A1* | 5/2005 | Caren et al. | 435/6 |
| 2006/0002817 A1* | 1/2006 | Bohm et al. | 422/57 |
| 2006/0018797 A1* | 1/2006 | Burnell et al. | 422/100 |
| 2006/0051214 A1* | 3/2006 | Ussing | 417/51 |
| 2006/0094004 A1* | 5/2006 | Nakajima et al. | 435/5 |
| 2006/0199260 A1* | 9/2006 | Zhang et al. | 435/293.1 |
| 2007/0015276 A1* | 1/2007 | LeBlanc et al. | 435/289.1 |
| 2007/0172389 A1* | 7/2007 | Wilding et al. | 422/58 |
| 2008/0041966 A1* | 2/2008 | Hiew et al. | 235/492 |
| 2008/0176289 A1* | 7/2008 | Zeng et al. | 435/91.2 |
| 2008/0248578 A1* | 10/2008 | Deans et al. | 436/8 |
| 2009/0028910 A1* | 1/2009 | DeSimone et al. | 424/401 |

OTHER PUBLICATIONS

CA Office Action dated May 7, 2014 in CA 2,696,372.
International Preliminary Report on Patentability dated Sep. 20, 2043 issued in PCT/US2008/072581.
European Partial Supplementary Search Report dated Apr. 1, 2015 issued in EP 08797454.9.
European Extended Search Report dated Jul. 20, 2015 issued in EP 08797454.9.
Becker et al. (2000) "Hot embossing as a method for the fabrication of polymer high aspect ratio structures," *Sensors and Actuators* 83(1-3): 130-135.

* cited by examiner

POLYMER MICROFLUIDIC BIOCHIP FABRICATION

CROSS-REFERENCE TO RELATED APPLICATIONS

This application is the National Stage of International Application No. PCT/US2008/072581, filed Aug. 8, 2008, which claims the benefit of U.S. Provisional Application No. 60/955,649 filed Aug. 14, 2007, the disclosures of which are incorporated herein by reference in their entirety for any and all purposes.

FIELD OF THE INVENTION

The present invention pertains to the field of thermoplastic polymers. The present invention also pertains to the field of microfluidic devices.

BACKGROUND OF THE INVENTION

Various scientific and patent publications are referred to herein. Each is incorporated by reference in its entirety.

Recent advances in miniaturization have led to the development of systems capable of performing chemical and physical processes on a micro-scale. Such systems have application to analytical and medical instrumentation, industrial process control equipment, liquid and gas phase chromatography, and detection of chemical and biological agents. One type of microfluidic system is the "microfluidic chip," which term generally refers to a device having channels, chambers, or other features on the micron or sub-micron scale, i.e., having at least one cross-sectional dimension in the range of from about 0.1 micrometer to about 500 micrometers.

In some cases, microfluidic chips may incorporate biochemistries or biological molecules present at one or more locations on or within the chips, such molecules being used to purify or detect analytes present in samples introduced to the chips. However, many biochemicals, e.g., nucleic acid probes, can tolerate only mild environmental conditions. As a result, certain manufacturing processes applied to microfluidic chips, such as thermal plastic melt welding, pose a challenge to incorporating biochemicals within microfluidic chips.

Forming features having characteristic dimensions in the range of micrometers or in the range of tens of micrometers, as is specified in certain microfluidic applications, poses further challenges. One method for forming features is injection molding, which entails injecting a liquid or molten plastic, metal, or other material at high pressure into a mold having the shape of the desired product. Such methods, however, face challenges in forming structures in the micrometer size range.

Given the described limitations in the current state of the art, there is a need for methods for efficiently producing devices having micrometer-scale features, such devices being fabricated in a way that does not adversely affect biomolecules or other functionalities present on or within the devices.

SUMMARY OF THE INVENTION

In meeting the described challenges, disclosed are methods for fabricating a microfluidic device, comprising constraining the dimensions of a thermoplastic workpiece in a sealable compression chamber, at least a portion of the thermoplastic workpiece being at a temperature above about the glass transition temperature of the thermoplastic workpiece; compressing the thermoplastic workpiece in the sealable compression chamber; and impressing at least a portion of the thermoplastic workpiece with at least one microstructured die, the microstructured die being capable of operation independent from the sealable compression chamber, the microstructured die displacing at least a portion of the thermoplastic workpiece so as to give rise to at least one microfluidic feature, the microfluidic feature comprising at least one surface, the microfluidic feature being characterized as having at least one characteristic dimension of less than about 100 micrometers, and maintaining the impressing for at least a period of time necessary for at least a portion of the at least one microfluidic feature to cool to a temperature equal to or less than the glass transition temperature of the thermoplastic workpiece.

Also disclosed are methods for fabricating a bonded microfluidic structure, comprising applying, proximate to a structural feature of a thermoplastic substrate, a radiation-absorbing compound capable of converting radiation to heat, the structural feature comprising at least one characteristic dimension in the range of from about 0.5 micrometers to about 100 micrometers; contacting an opposing thermoplastic member to the absorbing compound, a region of the thermoplastic substrate proximate to the radiation-absorbing compound, or to both; and irradiating at least a portion of the radiation-absorbing compound to give rise to one or more heated portions of the thermoplastic substrate, the heated portions of the substrate being capable of adhering to at least a portion of the opposing thermoplastic member, and bonding the thermoplastic substrate and opposing thermoplastic member to give rise to a sealably bonded structure comprising one or more microfluidic elements.

Further disclosed are microfluidic workpieces, comprising a microfluidic feature impressed in the surface of a thermoplastic substrate, the microfluidic feature comprising a characteristic dimension in the range of from about 0.5 micrometers to about 100 micrometers.

Additionally provided are microfluidic devices, comprising: a microfluidic feature impressed in the surface of a thermoplastic substrate, the microfluidic feature being characterized as having a characteristic dimension of less than about 100 micrometers; a sample loading inlet capable of being in fluid communication with the microfluidic feature, the sample loading inlet and microfluidic feature capable of fluid communication with one another; and a cover member, the microfluidic feature being enclosed at least in part by the cover member, by the polymeric substrate, or by both.

Further provided are apparatuses for fabricating a polymeric microfluidic device, comprising a sealable compression chamber comprising a sample inlet through which a moldable material is injected to fill the sealable compression chamber, the sealable compression chamber being capable of accommodating a compression force of up to about 150 tons applied to the moldable material contained within the sealable compression chamber; a microstructured die comprising at least one feature having a characteristic dimension in the range of from about 0.5 micrometers to about 100 micrometers, the microstructured die being capable of being operated independently of the sealable compression chamber, and the sealable compression chamber being capable of accommodating the microstructured die being impressed against the moldable material contained within the sealable compression chamber.

The present invention also provides kits for analyzing an analyte-containing sample, comprising a thermoplastic microfluidic device comprising at least one microfluidic feature impressed into the thermoplastic microfluidic device, the microfluidic feature being characterized as having a dimension of less than about 100 micrometers, the microfluidic device comprising a sample inlet in fluidic communication with an analysis region, the analysis region comprising at least one probe residing within the microfluidic feature, the probe being capable of specifically binding to an analyte; and a supply of buffer.

Further disclosed are kits for cell lysing, comprising a thermoplastic fluidic device comprising: a sample loading inlet in fluidic communication with a lysing region, the lysing region being in fluidic communication with the filter, a filter being capable of fluidically communicating one or more analyte molecules to the molecule capture region, the molecule capture region being in fluidic communication with both an elution inlet and an elution tip, the lysing region capable of being heated to greater than 95° C. and pressurized to at least about 10 psi greater than the ambient atmospheric pressure to provide a lysed sample, and the molecule capture region capable of being heated to at least about 40° C., and a chaotropic material.

Also disclosed are thermoplastic microfluidic analytical devices, comprising: at least one microfluidic feature impressed into the thermoplastic microfluidic analytical device, the microfluidic feature being characterized as having a dimension of less than about 100 micrometers, the thermoplastic microfluidic analytical device comprising a sample inlet in fluidic communication with an analysis region, the analysis region comprising at least one probe capable of specifically binding an analyte, and the at least one probe residing within the microfluidic feature.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Terms

Figure 1:
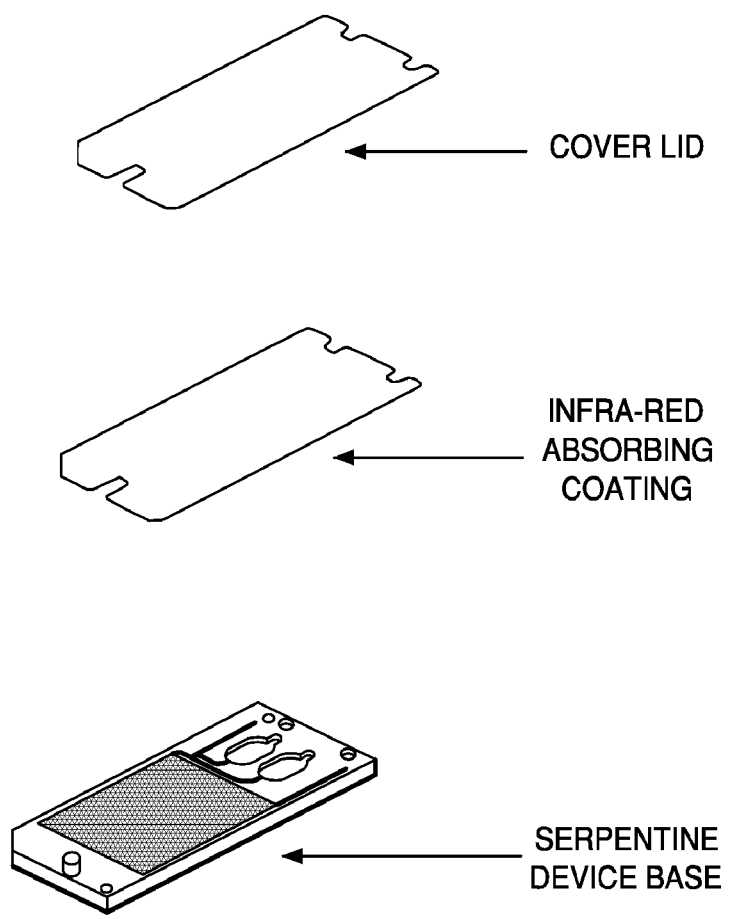
FIG. 1 is an exploded view of the components of a representative microfluidic device produced according to the present invention.

The term "microfluidic" as used herein describes an object, feature, device, and the like having at least one characteristic dimension in the range of from about 0.1 micrometers to about 100 micrometers and also being capable of accommodating one or more moving fluid molecules. As an example, a microfluidic feature would include a channel having a width of about 50 microns, the channel being used to carry a fluid from one location on a device to another.

The term "microstructured" as used herein means having at least one characteristic dimension in the range of from about 0.1 micrometers to about 100 micrometers.

The term "liquidus temperature" as used herein means the temperature at which a material becomes fully liquid upon heating. As an example, a thermoplastic above its liquidus temperature would be free-flowing. Many different types of polymeric materials are capable of having a liquidus temperature. For example, a crystalline or semi-crystalline material will have a liquidus temperature above its melt transition temperature. A glassy material will have a liquidus temperature above its glass transition temperature. An ordered material, such as a thermoplastic elastomer, will have a liquidus temperature above its order-disorder transition temperature. Typically, a material above its liquidus temperature will be characterized as having an amorphous morphology.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention that are, for clarity, described herein in the context of separate embodiments, may also be provided in combination in a single embodiment. Conversely, various features of the invention that are, for brevity, described in the context of a single embodiment, may also be provided separately or in any subcombination. Further, references to values stated in ranges include each and every value within that range.

Disclosed are methods for fabricating microfluidic devices. These methods include constraining the dimensions of a thermoplastic workpiece in a sealable compression chamber. Suitable chambers include molds or other hollowed forms, and are suitably made from, inter alia, metals or other materials capable of tolerating high temperatures and pressures. In the disclosed methods, at least a portion of the thermoplastic workpiece is, at least upon introduction into the sealable compression chamber, at a temperature above about the glass transition temperature of the thermoplastic workpiece.

The thermoplastic workpiece is compressed in the sealable compression chamber and at least a portion of the thermoplastic workpiece is impressed with at least one microstructured die. Suitable dies are capable of being operated independently from the sealable compression chamber. The die suitably displaces at least a portion of the thermoplastic workpiece so as to give rise to at least one microfluidic feature.

Suitable dies, described in additional detail further herein, include one or more features, such as grooves or channels, which, when impressed into the thermoplastic workpiece, result in the formation of the negative of such features in the impressed surface of the workpiece. As one non-limiting example, a die that includes a single raised ridge would produce a channel in the surface of the thermoplastic workpiece.

Suitable microfluidic features include at least one surface, and are suitably characterized as having at least one characteristic dimension of less than about 100 micrometers. A non-limiting example of such a feature would be a channel formed in the surface of the thermoplastic workpiece, where the channel has a depth of about 50 micrometers. Other features include, inter alia, posts, divots, and the like, and are discussed in additional detail elsewhere herein.

Without being bound to any one theory of operation, it is believed that microscale dimensions influence the performance of microfluidic microarray devices. As discussed in West, et al., U.S. Pat. App. No. 2005/0095602 A1, filed Nov. 4, 2003, it is believed that diffusion is one factor affecting the time specified to analyze a given sample residing in a channel of a microfluidic device. Because of the relation between channel depth and diffusion distances, as a microfluidic channel becomes shallower, the time specified for a sample analyte residing in a fluid contained within the channel to diffuse to a probe bound to a surface of the channel decreases. Thus, it is believed that analyses performed in shallow microfluidic channels (less than about 20 microns in depth) may be accomplished more quickly than analyses performed in deeper (greater than about 50 microns) microfluidic channels.

Without being bound to any one theory of operation, it is believed that the relationship for diffusion of a molecular analyte within a channel is governed by the equation, $d^2=2Dt$, where d is the height of the channel, D is the diffusion constant of the analyte of interest and t is the time of diffusion. As illustrated by this equation and assuming stop flow conditions, the depth of the channel has a significant effect on the diffusion time. As a non-limiting example, where channels have a depth of about 100 microns, the expected diffusion time is greater than about 50 seconds. Where, however, the depth of these channels is reduced, the diffusion time is reduced dramatically: channels having depths of between 5 and 10 microns may have diffusion times of less than one second.

When the stop flow condition is removed and replaced with a continuous flowing system, the contact time of the target analyte to the surface of the channel becomes significant. Channels having depths of over 100 microns can be employed, but are generally less suitable for all applications in that an analyte might not diffuse to a probe residing on a surface of the channel in time to hybridize before traveling along a given channel length. By contrast, channels having a shallower depth dimension may allow for more rapid hybridization, even under continuous flow conditions.

The methods also include maintaining the impressing of the die against the thermoplastic workpiece for at least a period of time necessary for at least a portion of the at least one microfluidic feature to cool to a temperature equal to or less than the glass transition temperature of the thermoplastic workpiece. Without being bound to any particular theory of operation, it is believed that this allows the thermoplastic to cool and effectively harden around the feature or features of the die such that the thermoplastic suitably retains those features after molding. This time period can, in some embodiments, last only several seconds, but it may depend on process conditions and the materials being used.

The methods also suitably include maintaining the sealable compression chamber at a temperature less than about the glass transition temperature of the thermoplastic workpiece. Without being bound to any particular theory of operation, it is believed that this allows for comparatively rapid cooling of the thermoplastic workpiece once it is introduced to the sealable compression chamber. Further, it is believed, without being bound to any one theory of operation, that this allows the thermoplastic workpiece to more rapidly harden around the features of the die as the die is impressed against the thermoplastic workpiece.

The thermoplastic workpiece can suitably include a cyclic molecule or even a bridged cyclic molecule. Especially suitable thermoplastics are TOPAS™ COC 5013 and COC 6013, cyclic olefin resins (www.topas.com, Frankfurt, Germany and Florence, Ky., USA) that include bridged, norbornene-type repeat units or "mers."

Suitable thermoplastic workpieces are essentially non-reactive or minimally-reactive to biological chemistries and biological molecules. Such thermoplastics are typically inert to biochemicals; and are suitably non-toxic to cell samples and also, where necessary, inert to blood, saliva, buffers, and other media typically used to suspend or transport cells and other biological material.

Suitable thermoplastic workpieces are typically essentially transparent to light. Workpieces where the constituent thermoplastic is essentially transparent to at least a portion of the visible light spectrum are also suitable, particularly when the thermoplastic is essentially transparent to at least a portion of the infrared light spectrum, or to at least a portion of the ultraviolet light spectrum, or even to light having a wavelength in the range of from about 1 nm to about 1 mm. Workpieces that are transparent to deep ultraviolet light, to far-infrared light, or to any frequency between, are also suitable.

Constraining the dimensions of the workpiece is accomplished by placing the workpiece in a mold or cavity. Compression of the workpiece is typically accomplished by the application of hydraulic pressure to the workpiece by the compression chamber. Mechanical pressure is also a suitable source of compression. The steps of compressing and impressing are performed sequentially, or, in some embodiments, are performed simultaneously.

The impressing of the workpiece with the microstructured die suitably occurs at a temperature below the liquidus temperature of the thermoplastic workpiece. In certain embodiments, the impressing occurs at a temperature about 5° C. below the liquidus temperature of the thermoplastic workpiece. Without being bound to any particular theory of operation, it is believed that performing the impressing of the thermoplastic workpiece at a temperature minimally below the liquidus temperature of the thermoplastic aligns the polymer chains of the thermoplastic substrate so as to permit formation of durable features having at least one characteristic dimension in the 0.5 to about 100 micron range. The workpiece is typically maintained at a temperature between the glass transition temperature of the thermoplastic workpiece and the liquidus temperature of the thermoplastic workpiece by heating or, as needed, cooling at least a portion of the compression chamber.

The thermoplastic workpiece suitably shrinks by less than about 1% by volume upon cooling to below its liquidus temperature, or by less than about 0.7% by volume upon cooling to below its liquidus temperature, or even shrinks in the range of from about 0.4% by volume to about 0.7% by volume upon cooling to below its liquidus temperature. Without being bound to any particular theory of operation, it is believed that minimized shrinking of the thermoplastic after cooling enhances the ability of the microstructured features of the present invention to retain their geometries after the workpiece cools.

The surfaces of the microstructured dies of the present invention can include stamps, stencils, relief patterns, molds, or any combination thereof. Some suitable dies include relief patterns for stamping single channels, multiple channels, pegs, serpentine patterns, and the like. The pattern on the surface of the die will be dictated by the particular needs of the user and the particular application for the device. The surfaces of the dies may also be pitted, roughened, or otherwise milled so as to form patterns with roughened or uneven surfaces capable of enhancing mixing in a fluid that passes along the surface.

Microfluidic features suitably formed by the inventive method in the surface of the workpiece include at least one dimension of less than about 100 micrometers. Suitable features include trenches, channels, grooves, depressions, pits, ramps, mixing zones, splitters, posts, obstacles, nubbins, conduits, reservoirs, or any combination thereof.

Suitable dies are operable independent of the compression chamber. This is to allow the insertion and removal of the die from the chamber without necessarily releasing the constraint on the dimensions of the workpiece in the compression chamber.

The invention also includes the step of depositing one or more probes onto at least one surface of a microfluidic feature of the thermoplastic workpiece. Suitable probes include nucleic acids, amino acids, macromolecules, and the like. Typical probes include sequences of nucleic acids that are themselves complementary to specific nucleic acid sequences indicative of the presence of one or more toxins, genes, mutations, or other items of interest in a particular sample of material.

A portion of at least one surface of a microfluidic feature is, in some embodiments, chemically modified so as to render the surface capable of binding to at least a portion of the one or more probes. Suitable surface modifications depend on the chemical structures of the thermoplastic workpiece and on the chemical structure of the probes. Modifications suitable to a given combination of workpiece thermoplastic and given probes will be readily apparent to those having ordinary skill in the art. Non-limiting surface modifiers include hydrophobic species, hydrocarbons, and silanes.

In some embodiments, the invention includes the step of placing a porous medium within a microfluidic feature. Typically, the porous medium includes pores having a surface, the pores permitting fluid communication through the porous medium. One or more probes are typically placed on, within, or bound to the porous medium; typically, at least a portion of the probes bind o at least a part of the porous medium. In some embodiments, the porous medium includes one or more functional groups capable of binding a nucleic acid. The porous medium may be fabricated by polymerizing a monomer in situ at the desired location within a microfluidic feature.

As one non-limiting example, a nucleic acid capable of binding expressed genes in a biological sample is oligo-T (i.e., for hybridization of poly-A segments of mRNA). Other more selective oligonucleotide sequences can also be applied to the surface. In such an embodiment, a plurality of nucleotide probes is deposited at specific, known locations on the bottom surface of the microfluidic channel to form an array of oligonucleotides. The array is then useful for detecting one or more gene sequences in a biological sample. As a non-limiting example, amine-containing oligonucleotides are bound to porous media via a monomer capable of copolymerizing with the porous media and also including a functional group capable of forming a covalent bond with oligonucleotide. Examples of suitable functional groups capable of binding oligo-T include glycidyl, or aldehyde chemistries. Suitable monomers include, ethylene glycol dimethacrylate, 2-hydroxyl ethyl methacrylate, tetrahydroxyl furan methacrylate, lauryl acrylate, morpholine acrylate, 2-hydroxy ethyl acrylate, and preferably glycidyl methacrylate ("GMA").

The porous medium can also include a highly crosslinked polymer. Crosslinked polymers are well known to those having ordinary skill in the art. Suitable cross-linked polymers typically include units derived from at least one mono-ethylenically unsaturated monomer, at least one multi-ethylenically unsaturated monomer, or a combination thereof. Examples of suitable mono-ethylenically unsaturated monomer include any of the mono-ethylenically unsaturated, functionalized or unfunctionalized, acrylic or methacrylic monomers known in the polymer art, such as 2-hydroxyethyl acrylate, 2-hydroxyethyl methacrylate, glycidyl methacrylate and 9-anthracenylmethyl methacrylate. Other suitable mono-ethylenically unsaturated monomers include allylglycidyl ether, 2-vinyl oxirane, and polybutadiene-maleic anhydride. Examples of functional groups include, inter alia, alcohol (e.g., hydroxyethylmethacrylate) and glycidyl (e.g., glycidyl methacrylate). Examples of multi-ethylenically unsaturated monomer include ethylene glycol dimethacrylate ("EGDMA"), polyethyleneglycol dimethacrylate, tetraethyleneglycol dimethacrylate, triethyleneglycol dimethacrylate, ethylene dimethacrylate, 1,3-butanediol dimethacrylate, 1,4-butanediol dimethacrylate, 1,6-hexanediol diacrylate, tripropyleneglycol diacrylate, trimethylolpropane triacrylate ("TMPTA"), trimethylolpropane trimethylacrylate ("TMPTMA"). Such porous media are prepared by using a suitable UV photo initiator, such as Irgacure™ 1800.

The disclosed methods also suitably include incorporating into the microfluidic device a filter capable of filtering molecules from a fluid. Such filters are typically chosen to filter cell-sized bodies or particles from a fluid, but suitable filters may also be chosen to filter bodies or particles having dimensions on the order of parts of cells or of viruses. The methods also include the step of incorporating one or more connections capable of placing the microfluidic device in fluid communication with a fluid source external to the microfluidic device.

The methods also include suitably removing gas from the sealable compression chamber that is displaced when the thermoplastic workpiece is impressed with the microstructures die. This removal is accomplished by venting the sealable compression chamber to the ambient environment, by forcibly removing any displaced gas by suction, or by other methods that will be apparent to those having ordinary skill in the art.

The invention also includes microfluidic devices fabricated according to the claimed methods.

Also disclosed are methods for fabricating bonded microfluidic structures. These methods include applying, proximate to a structural feature of a thermoplastic substrate, a radiation-absorbing compound capable of converting radiation to heat, the structural feature comprising at least one characteristic dimension in the range of from about 0.5 micrometers to about 100 micrometers. The methods also include contacting an opposing thermoplastic member to the absorbing compound, to a region of the thermoplastic substrate proximate to the radiation-absorbing compound, or to both; followed by irradiating at least a portion of the radiation-absorbing compound to give rise to one or more heated portions of the thermoplastic substrate, wherein the heated portions of the substrate become liquidus and are capable of adhering to at least a portion of the opposing thermoplastic member. The interface between the heated thermoplastic substrate and opposing thermoplastic member is then bonded together to yield a sealed bonded structure comprising one or more microfluidic elements.

Applying the radiation-absorbing compound is typically accomplished by brushing, spraying, inking, pipetting or other, similar methods. The radiation-absorbing compound may also be applied with an inking stamp, a roller stamp, or even with a felt-tip or other suitable pen.

Suitable radiation-absorbing compounds typically absorb infrared radiation. One non-limiting example of a suitable radiation-absorbing compound is Clearweld™ (www.clearweld.com, Simpson, Pa., USA), which absorbs infrared radiation. Compounds that absorb ultraviolet radiation are also considered suitable. Carbon compounded into the resin of one of the substrates to be bonded is also suitable for some applications.

Suitable radiation-absorbing compounds are transparent to at least a portion of the visible light spectrum at all times. Alternatively, such compounds are transparent to at least a portion of the visible light spectrum after they are irradiated.

Thermoplastics suitable for use in the thermoplastic substrates, opposing thermoplastic members, or both, are described elsewhere herein. The opposing thermoplastic member and the thermoplastic substrate can have the same composition, or, in some embodiments, can have different compositions, and the methods suitably bond dissimilar materials when specified by the user. The opposing thermoplastic member can be a lid, a cap, a cover, a conduit, a channel, or any combination thereof.

FIG. 1 is an exploded view of the components of a microfluidic device before bonding. The relative positions of the thermoplastic substrate, the radiation-absorbing compound, and the opposing thermoplastic member are shown.

Figure 2:
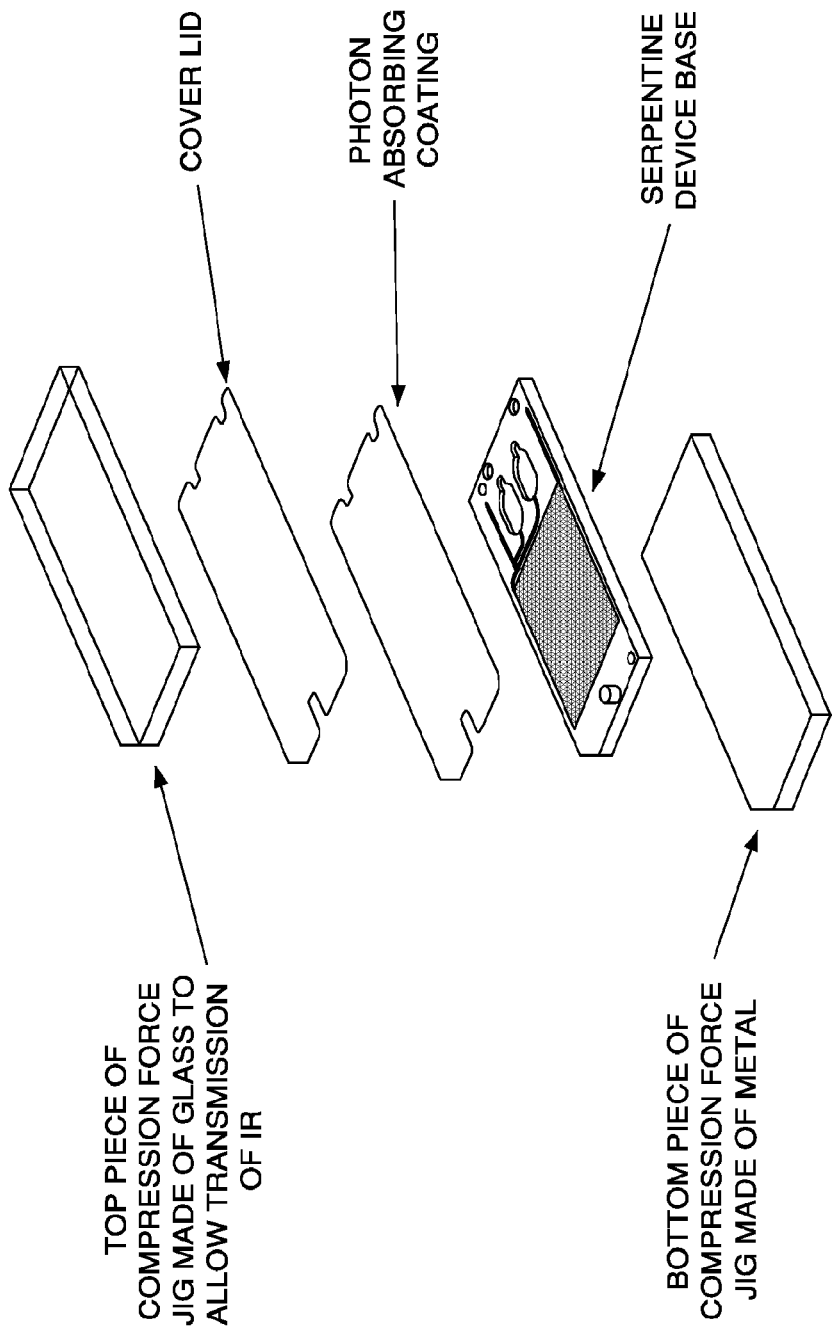
FIG. 2 is an exploded view of the components of a representative microfluidic device produced according to the present invention and depicts a compression force jig used in the fabrication of certain microfluidic devices.
Figure 3:
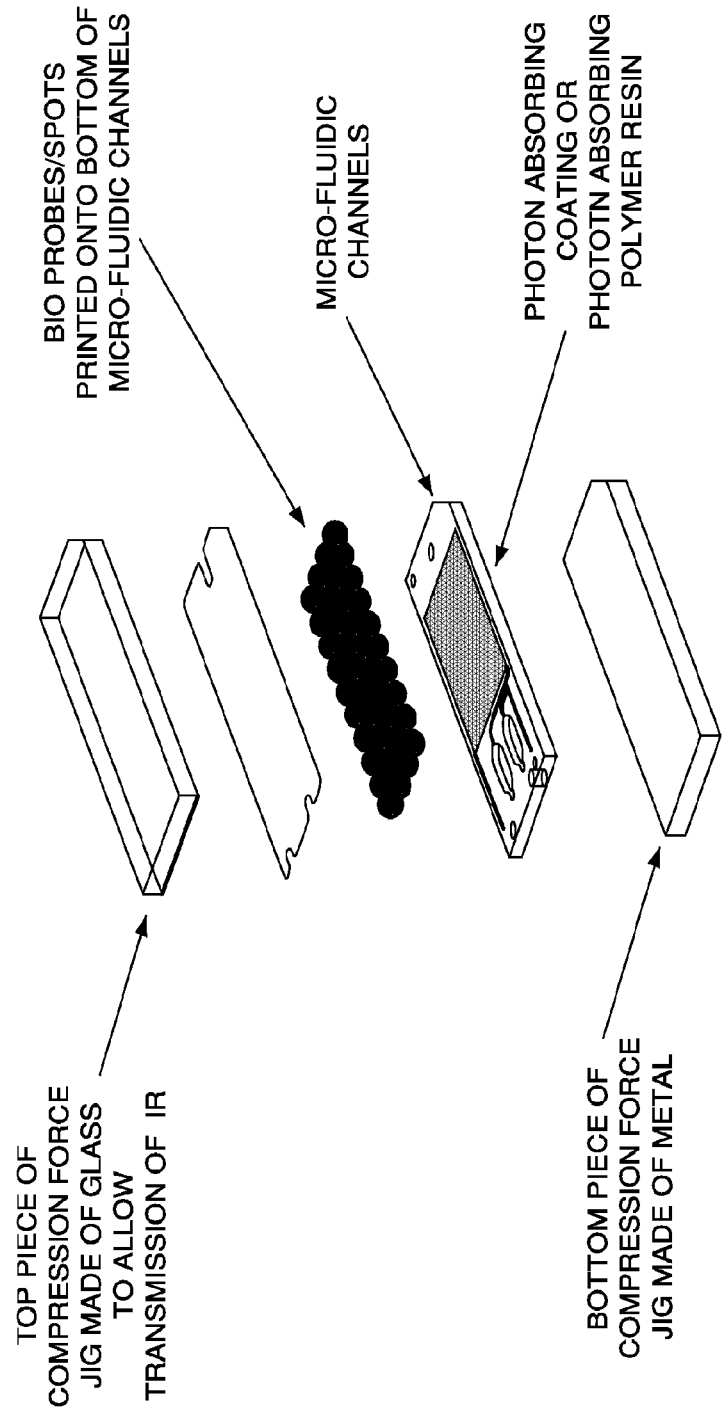
FIG. 3 is an exploded view of the components of a representative microfluidic device produced according to the present invention and depicts the placement of biological probes within the microfluidic channels of a representative device.

The contacting of the opposing thermoplastic member to either the absorbing compound, a region of the thermoplastic substrate proximate to radiation-absorbing compound, or to both, is typically performed under a compression force. Representative depictions of this aspect of the methods are shown in FIG. 2 and FIG. 3, in which compression force jigs are shown oriented to apply compressive force to the opposing member cover lid during the irradiation and bonding processes. As shown in FIG. 2 and FIG. 3, the top piece of a compression force jig may be made of glass or other radiation-transmissive material to permit the passage of radiation to the radiation-absorbing compound.

In certain embodiments, the opposing thermoplastic member has a higher glass transition temperature ("Tg") than does the thermoplastic substrate. Without being bound to any particular theory of operating, it is believed that utilizing an opposing thermoplastic member that has a higher Tg, or a higher deflection temperature under load ("DTUL"), or both, than the thermoplastic substrate. For example, where the opposing member is a thin, film-like lid, the opposing thermoplastic member is chosen to have a higher Tg or DTUL than that of the thermoplastic substrate so as to allow the lid to impress and deform the substrate without the film-like lid also deforming or warping under those process conditions. TOPAS™ COC 6013 is considered a suitable material for the opposing member, and TOPAS™ 5013 is considered a suitable material for the thermoplastic substrate.

In other embodiments, the opposing thermoplastic member has a lower melt volume rate than does the thermoplastic substrate. Without being bound to any particular theory of operation, it is believed that there is some benefit to using a lower melt volume rate thermoplastic for a lid because such materials are suitable for film extrusion, such as that used to make thin lids. By contrast, comparatively high melt-volume rate thermoplastics are suitable for compression molding and coining of substrates, as disclosed elsewhere herein. Control over process conditions where the relative melt volume rates of the substrate and opposing member permit compression and displacement of substrate material so as to control the dimensions of the microfluidic features in the substrate being sealed during the bonding process.

Suitable structural features include, inter alia, channels, conduits, troughs, walls, ridges, mixers, obstacles, reservoirs, tanks, depressions, divots, nubbins, grooves, or any combination thereof. Other features described elsewhere herein are also suitable.

Typically, the structural feature being bonded is cooled before the irradiating, during the irradiating, after the irradiating, or both. Cooling is accomplished by flowing a dry gas across the at least one structural feature before, during, or after the irradiating. In some embodiments, the gas is flowed during all steps of the method. Suitable dry gases include argon, helium, nitrogen, or any combination thereof; other suitable gases will be apparent to those having ordinary skill in the art.

The bonded devices typically include one or more microfluidic elements within the device. Such elements can include channels, conduits, and the like. Elements within the device are typically completely enclosed within a unified thermoplastic piece resulting from the bonding of the thermoplastic substrate and the opposing member. In some embodiments, at least a portion of a microfluidic element of a bonded device is partially open or otherwise exposed to the environment external to the device.

The methods typically also include the step of depositing one or more probes onto at least one surface of the at least one structural feature, prior to contacting the opposing thermoplastic member to either the radiation-absorbing compound, to a region of the thermoplastic substrate proximate to radiation-absorbing compound, or to both.

The methods also include the placement of a porous medium within at least a portion of the at least one structural feature before contacting the opposing thermoplastic member to either the absorbing compound, to a region of the thermoplastic substrate proximate to radiation-absorbing compound, or to both. Suitable porous media typically include one or more probes. Suitable porous media, probes, and methods of integrating such probes into porous media are described elsewhere herein.

The irradiating is accomplished by exposing the radiation-absorbing compound to the appropriate radiation. The radiation may be applied as a curtain of radiation, as in FIG. 4, as an isolated spot or spots of radiation, or even as a beam or blanket of radiation.

FIG. 3 is a non-limiting exploded view of a microfluidic device incorporating probes as described elsewhere herein. As shown in FIG. 3, the probes are deposited onto the bottom of microfluidic channels formed in the thermoplastic substrate. The probes can be suitably deposited on the surfaces of the channels by microfluidic devices, droppers, mechanical spotters, robotic spotters, or other similar devices.

Figure 4:
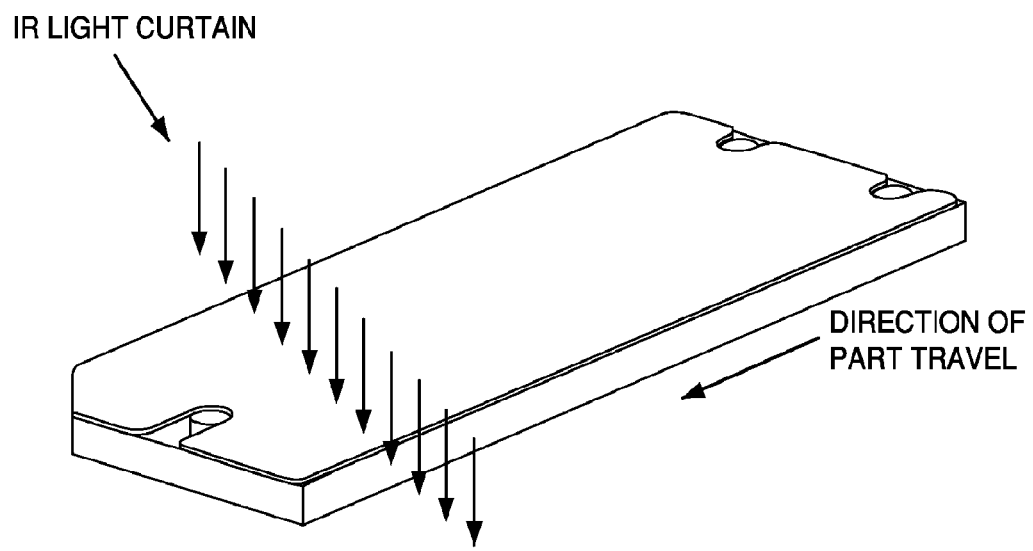
FIG. 4 depicts irradiation, by a curtain of infra-red ("IR") light, of a layer of radiation-absorbing composition residing between the base and lid of a representative microfluidic device.
Figure 5:
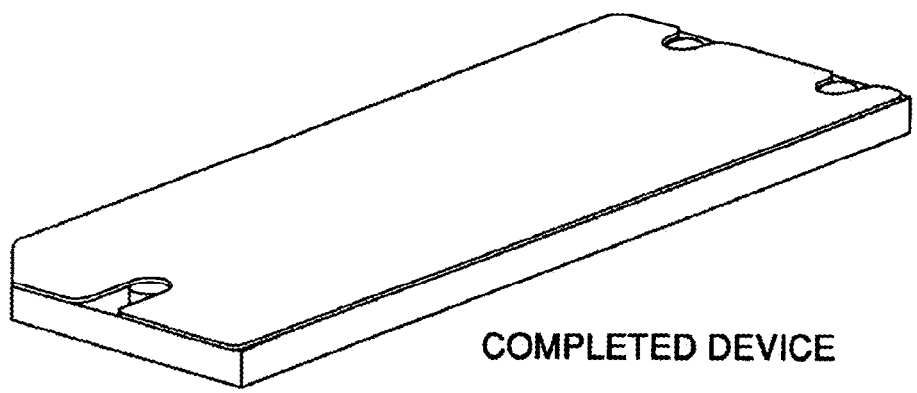
FIG. 5 depicts a completed, representative microfluidic device.

FIG. 4 is a non-limiting schematic view of microfluidic device being bonded by infrared radiation. In that figure, a representative device travels through a curtain of infrared light such that the infrared light is absorbed by the radiation-absorbing compound of the disclosed methods, which compound in turn heats, softens, and bonds the cover lid and thermoplastic substrate. FIG. 5 depicts the completed device resulting from the bonding of the components shown in FIG. 4.

Bonded microfluidic devices fabricated by the method are also within the scope of the invention.

Figure 6:
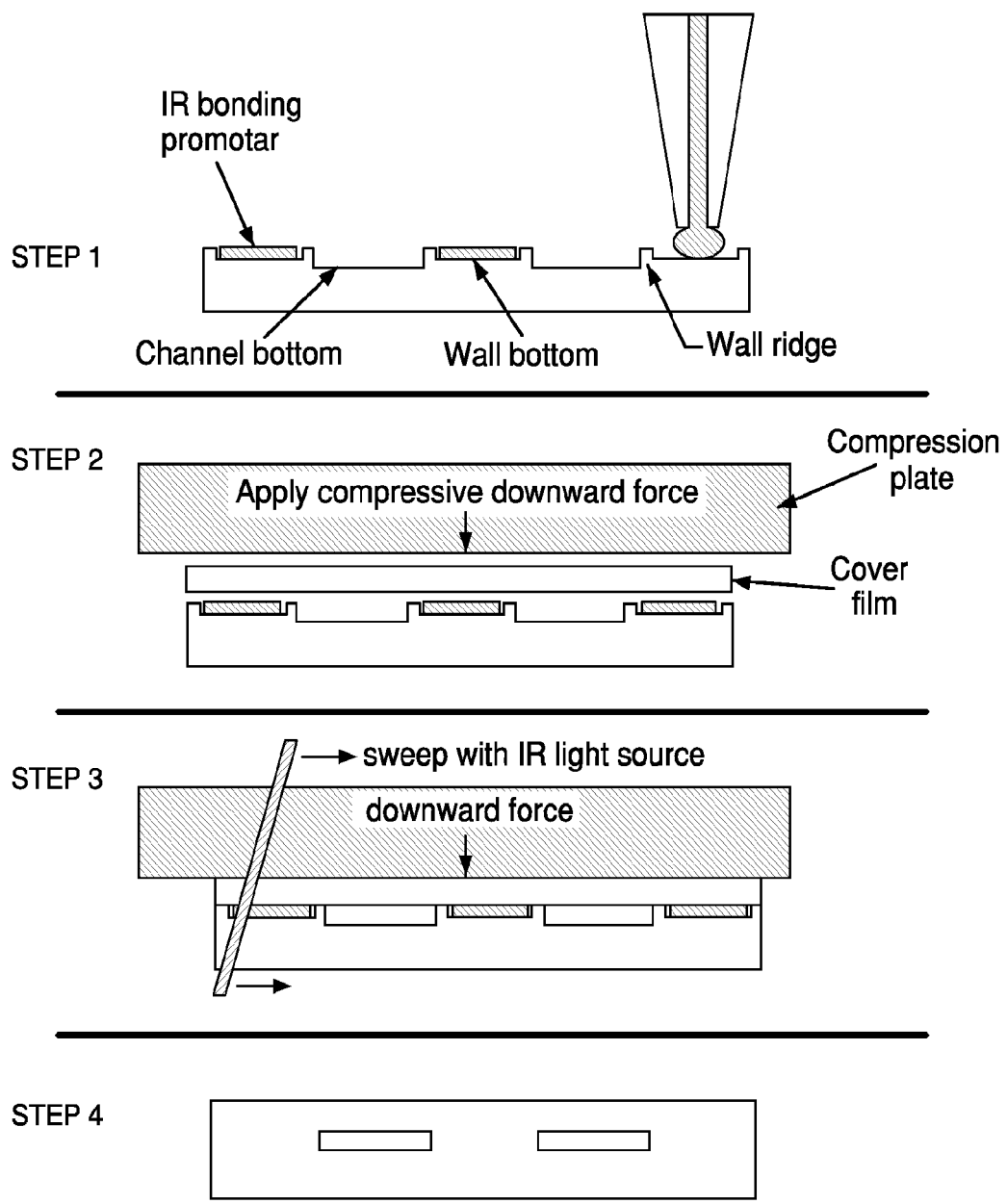
FIG. 6 depicts an embodiment of the claimed process for bonding a cover member to a thermoplastic device.

A non-limiting schematic of the disclosed bonding methods is shown in FIG. 6, where a cross-section of a sample thermoplastic substrate is shown. The structural features shown at Step 1 of FIG. 6 are two channels, and each of the channels is flanked by a walled trench. The walled trench is in turn filled at least in part with a radiation-absorbing compound, designated in FIG. 6 as "IR bonding promoter," and, as shown in FIG. 6, the walls of each trench prevent the radiation-absorbing compound from flowing down into the channel. Other configurations of walls, channels, or other features will be apparent to those having ordinary skill in the art.

Step 2 of FIG. 6 depicts an opposing member cover lid being positioned proximate and above the channels and walled trenches, and compression plate being positioned to apply a compressive force to the cover lid. At Step 3 of FIG. 6, a downward force is applied by the compression plate and infrared radiation is swept across the cover lid and substrate, softening the substrate and lid. As shown in Step 4 of FIG. 6, the result of the irradiation is bonding if the lid to the substrate at the location of the trench walls and radiation-absorbing compound to give rise to fully enclosed channels extending into the substrate.

Figure 7:
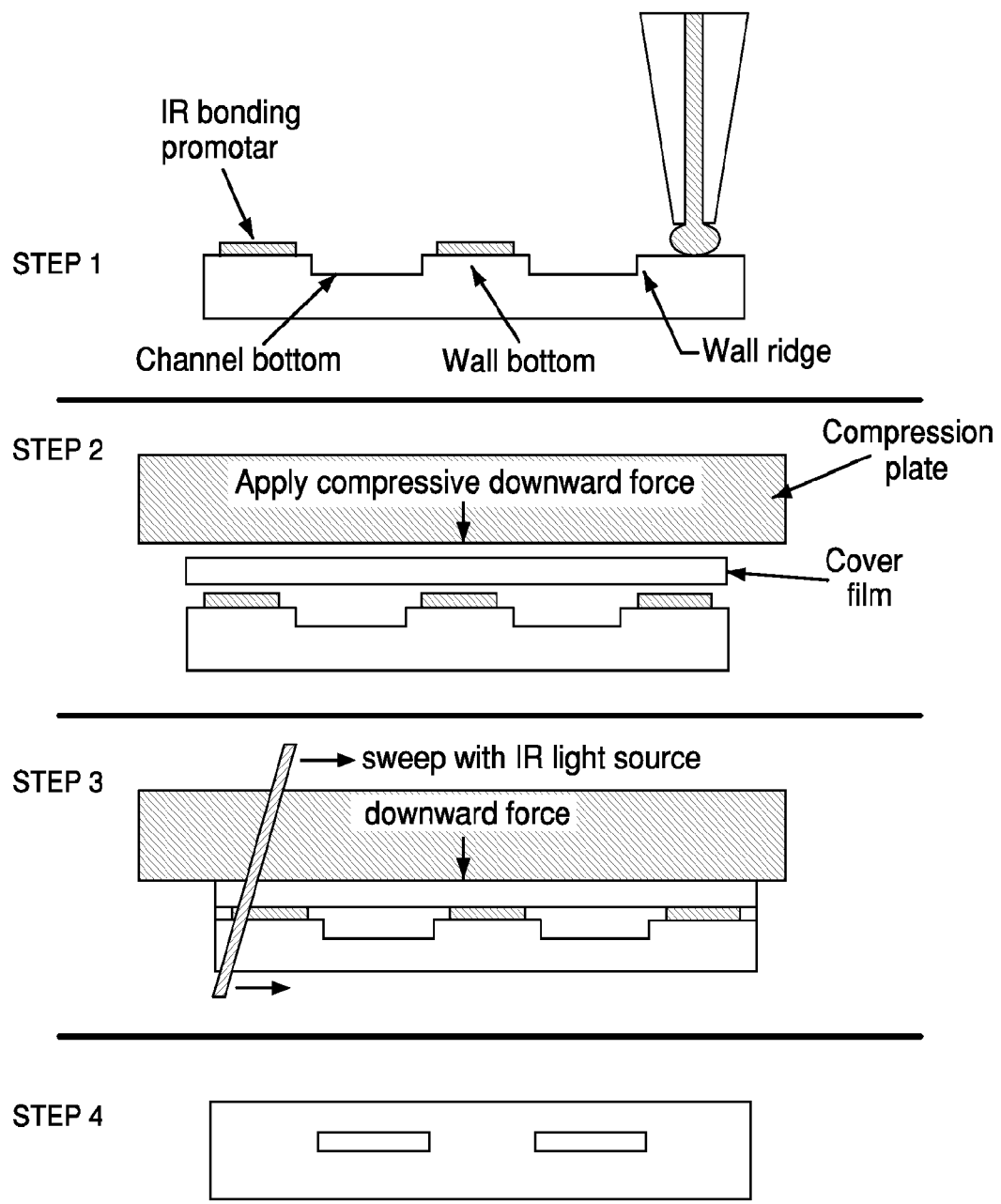
FIG. 7 depicts an additional representative embodiment of the claimed process for bonding a cover member to a thermoplastic substrate.

FIG. 7 depicts an alternative, non-limiting embodiment of the present invention. The structural features shown at Step 1 of FIG. 7 are two parallel channels, each channel being bounded on either side by a raised surface of the substrate. A radiation-absorbing compound, designated by "IR bonding promoter", is applied to the raised surfaces, without flowing downward into the channels. At Step 2 of FIG. 7, an opposing member cover lid is positioned proximate to and above the channels and raised surfaces, and a compression plate is positioned to apply a compressive force to the cover lid.

At Step 3 of FIG. 7, a downward force is applied by the compression plate and infrared radiation is swept across the cover lid and substrate, softening the substrate and lid and, as shown in Step 4 of FIG. 7, bonding the lid to the substrate at the location of the trench walls and radiation-absorbing compound. As shown in Step 4, this gives rise to fully enclosed channels extending into the now-covered substrate.

Also disclosed are microfluidic workpieces. Such workpieces include a microfluidic feature impressed in the surface of a thermoplastic substrate, the features typically having a characteristic dimension in the range of from about 0.5 micrometers to about 100 micrometers.

Figure 8:
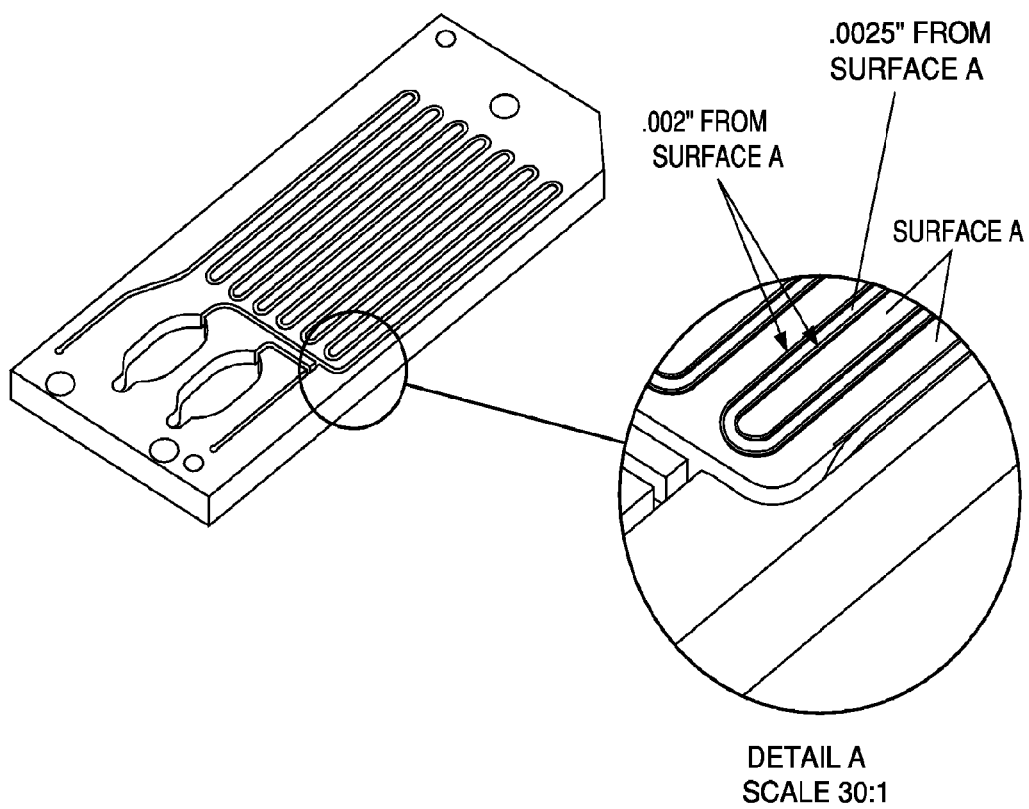
FIG. 8 depicts microscale features formed in a representative thermoplastic workpiece according to the present invention.

Suitable microfluidic features include channels, conduits, obstacles, walls, ridges, troughs, grooves, reservoirs, tanks, depressions, nubbins, divots, ramps, bumps, or any combination thereof. FIG. 8 depicts a representative workpiece in which the microfluidic feature is a serpentine channel formed in the surface of the substrate. Features may, in some embodiments, include one or more roughened surfaces, obstacles, or pillars to enhance mixing within a fluid traveling across or within the feature.

In one particular embodiment, the microfluidic feature is a wall, having a characteristic dimension in the range of from about 0.5 micrometers to about 100 micrometers, and residing proximate to at least one microfluidic features. The wall can reside proximate to and above a channel or groove. This is exemplified by the wall in FIG. 6, separating the IR bonding promoter material residing in the trench from the channel adjacent to the walled trench.

In certain embodiments, the bottom surface of a microfluidic feature is essentially flat, and the walls of the feature are essentially vertical, as illustrated by the flat-bottomed channel shown in FIG. 6. In other embodiments, the surfaces or walls of a given microfluidic feature can be ridged, pitted, dimpled, or otherwise roughened so as to enhance fluid mixing as a fluid is transported across or through the feature. In still other embodiments, a feature can include posts, pillars, pits, or other obstacles capable of disrupting fluid flow across the feature so as to enhance fluid mixing within or proximate to the microfluidic feature.

Microfluidic workpieces typically include, inter alia, at least one thermoplastic. Suitable thermoplastics are described elsewhere herein.

The microfluidic workpiece typically also includes at least one probe, the at least one probe typically residing on a surface of the microfluidic feature. In some embodiments, the at least one probe resides on or within a porous medium that is itself situated within the microfluidic feature. Suitable porous media and the integration of probes into such media are described elsewhere herein.

The disclosed microfluidic workpieces include, in some embodiments, one or more filters in fluidic communication with the microfluidic feature. Suitable filters are typically capable of filtering molecules from a liquid sample, and are characterized as having pore sizes of less than about 2 microns, or in the range of from about 0.02 microns to about 2 microns, or in the range of from 0.2 microns to about 0.5 microns.

Figure 9:
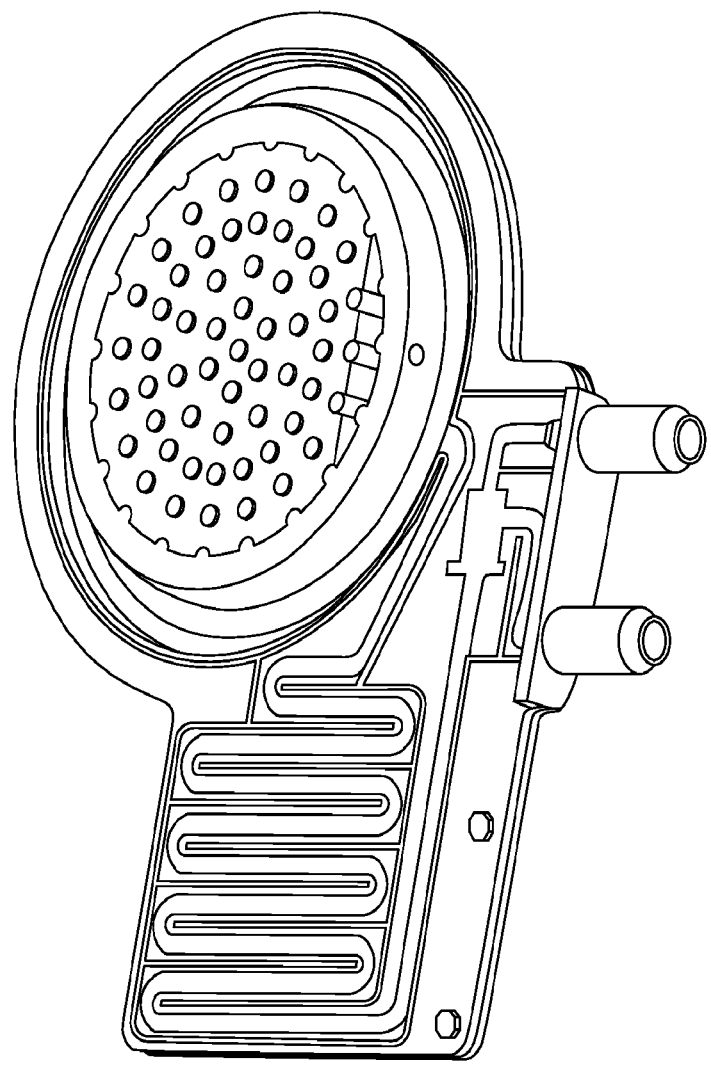
FIG. 9 depicts a representative microfluidic device formed according to the claimed invention.

FIG. 9 illustrates a representative microfluidic workpiece that includes a filter holder; the filter holder is shown as the circular region containing small pillars or nubbins or smaller circles at the right of the figure.

Workpieces can also include radiation-absorbing compounds, which compounds typically absorb infrared light. The radiation-absorbing compounds typically reside proximate to at least one microfluidic feature of the workpiece; placement of radiation-absorbing compound is illustrated in FIG. 6, where a radiation-absorbing compound resides in a trench that is itself located proximate to a channel. A suitable radiation-absorbing compound is Clearweld™ (www.clearweld.com, Simpson, Pa., USA), which absorbs infrared radiation.

Also disclosed are microfluidic devices. The disclosed devices include one or more microfluidic features impressed into the surface of a thermoplastic substrate, the microfluidic feature having a characteristic dimension of less than about 100 micrometers. The devices also include a sample loading inlet capable of fluid communication with the microfluidic feature; and the sample loading inlet and microfluidic feature capable of fluid communication with one another. The devices also include a cover member, and the microfluidic feature is typically enclosed at least in part by the cover member, by the thermoplastic substrate, or by both.

Suitable microfluidic features are described elsewhere herein, and include, inter alia, channels, grooves, trenches, obstacles, divots, and the like, as described elsewhere herein. In some embodiments, the microfluidic features are roughened or otherwise constructed to enhance fluid mixing as a fluid passes through or proximate to the feature. As a non-limiting example, pillars, pegs, pits, or other obstacles may be placed within a channel so as to enhance mixing within a fluid passing within the channel.

The cover members of the disclosed devices are typically caps, lids, and the like, and are typically sealably bonded to at least a portion of the polymeric substrate. Suitable methods for bonding cover members to substrates are described elsewhere herein.

The polymeric substrate, the cover member, or both, typically include a thermoplastic that is transparent to at least a portion of the visible light spectrum, although some embodiments include thermoplastics that are transparent to other forms of radiation. As an example, a device might include a thermoplastic that is transparent to radioactivity but not to visible light so as to protect any biological species or biochemicals residing within the device that are themselves susceptible to damage if exposed to visible light. Suitable thermoplastics are described elsewhere herein; TOPAS™ resin is considered especially suitable. The polymeric substrate and the cover member can be made of the same thermoplastic or different thermoplastics.

The disclosed devices typically also include at least one probe residing on at least one surface of the structural feature. Suitable probes are described elsewhere herein; in some embodiments, the probes reside on or within a porous medium present in a microfluidic feature of the device. Suitable porous media are described elsewhere herein.

Certain devices include a lysing region capable of being heated to at least about 95° C. and pressurized to at least about 10 psi greater than the ambient atmospheric pressure so as to provide a lysed sample. Such devices include an elution inlet and a filter capable of filtering molecules from a liquid sample, the filter being characterized as having a nominal pore size of less than about 2 microns, or in the range of from about 0.02 microns to about 2 microns, or even in the range of from about 0.2 microns to about 0.5 microns. Such devices also include an elution tip, and can also include a molecule capture region capable of being heated to at least about 40° C.

Typically, the devices feature the sample loading inlet being in fluidic communication with the lysing region, the lysing region being in fluidic communication with the filter, the filter being capable of fluidically communicating one or more molecules to the molecule capture region, and the molecule capture region being in fluidic communication with the elution inlet and the elution tip, or any combination thereof. FIG. 9 depicts such a device, in which the inlet, the left-hand conical projection at the bottom of the device, is in fluid communication with a serpentine channel and the lysing region, and the lysing region being in fluid communication with a filter, which is itself in fluid communication with the elution tip, the conical projection at the left-hand side of the lower edge of the device.

The present invention also includes apparatuses for fabricating polymeric microfluidic devices. These apparatuses include a sealable compression chamber comprising a sample inlet through which a moldable material is injected to fill the sealable compression chamber, the sealable compression chamber being capable of accommodating a compression force of up to about 150 tons applied to the moldable material contained within the sealable compression chamber. Suitable sealable compression chambers include two or more members; a two-piece clamshell-type mold is one non-limiting example of such a chamber.

The apparatuses also include a microstructured die comprising at least one feature having a characteristic dimension in the range of from about 0.5 micrometers to about 100 micrometers, the microstructured die being capable of being operated independently of the sealable compression chamber. The sealable compression chamber is suitably capable of accommodating the microstructured die being impressed against the moldable material contained within the sealable compression chamber, suitably while the material is under compressive force.

Figure 10:
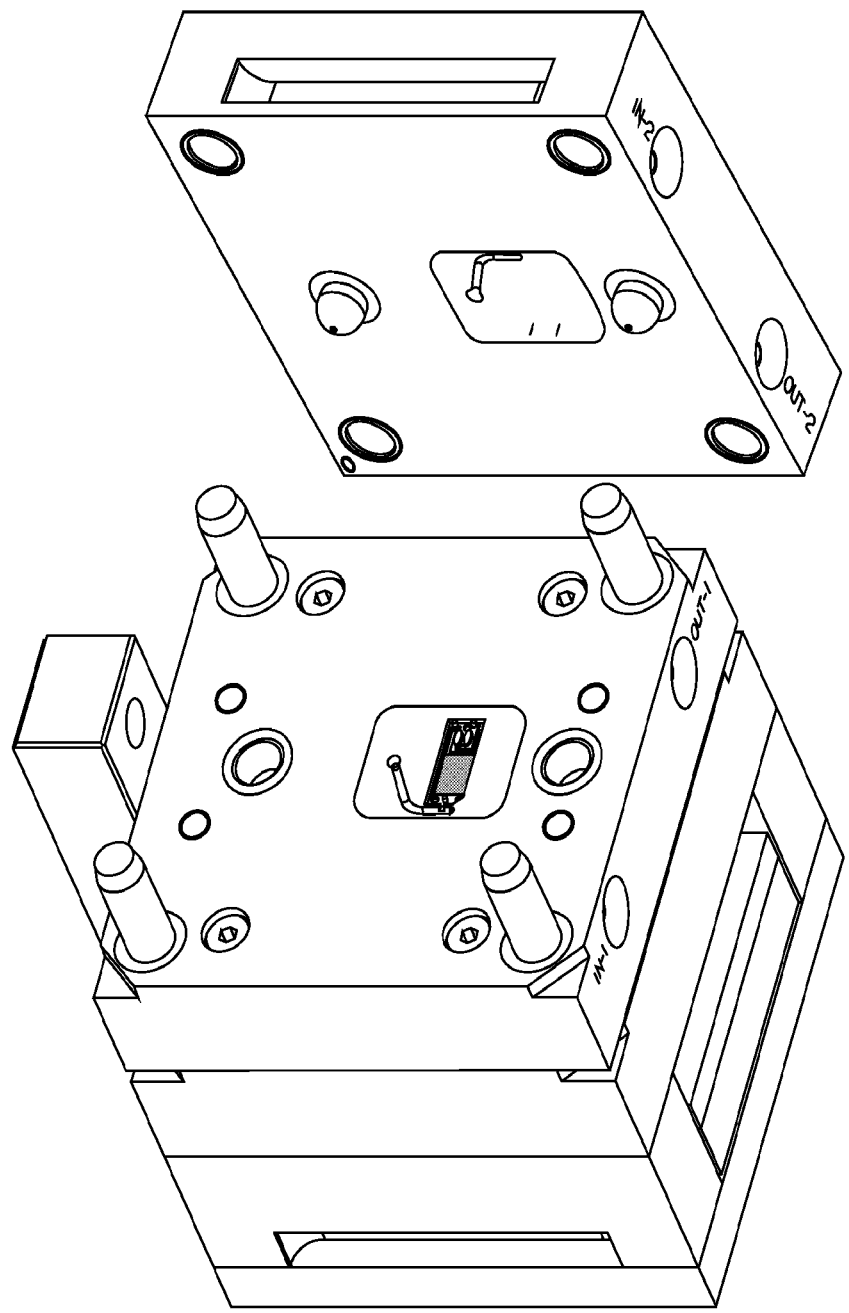
FIG. 10 depicts a representative compression chamber.

A representative apparatus is shown in FIG. 10. As shown in that figure, the compression chamber includes a lid—shown at the upper region of FIG. 10—that includes an inlet port for introduction of the material of the microfluidic device. Suitable moldable materials include, inter alia, thermoplastics, as described elsewhere herein.

As shown in the figure, the lid is complementary to the chamber base, which is shown at the lower region of the figure. The base includes an additional connection that, in the representative depiction of FIG. 10, mates to the inlet port of the lid so as to form a continuous conduit delivering resin to the compression chamber, which chamber is shown as a darkened rectangle at the center of the apparatus base.

Typically, the sealable compression chamber is capable of having heat added or removed. This may be accomplished by heaters, heat sinks, refrigerants, and the like. Suitable chambers are capable of operating at a temperature of at least about 300° C., or at least about 350° C.

Apparatuses also typically include at least one draft outlet capable of transmitting gas displaced from the sealable compression chamber during the chamber's operation. Transmission of displaced gas is, in some embodiments, useful to ensure proper operation of the apparatus and to eliminate "sink" or localized depressions or indentations in the molded microstructure.

Figure 11:
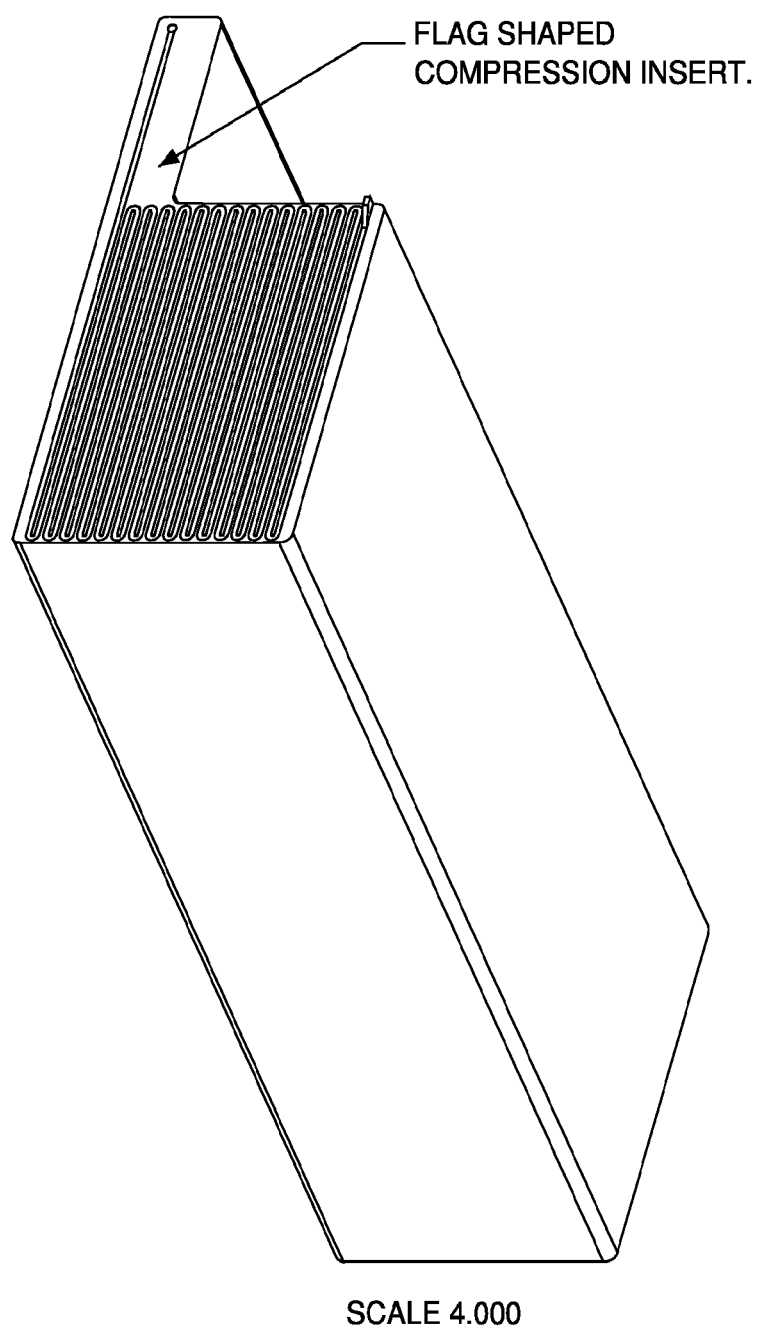
FIG. 11 depicts a microstructured die.

A representative microstructured die is shown in FIG. 11. The die shown in FIG. 11 is capable of being operated independently of the compression chamber shown in FIG. 10, and, as depicted in the representative figures, is inserted into the lid of the apparatus and then contacted with material residing in the compression chamber. The sample die shown in FIG. 11 includes a flag-shaped serpentine channel pattern, in which the comparatively long ridge at the left-hand region of the die creates a long channel that connects to the serpentine channel ridges at the center and right-hand regions of the die. Suitable dies include a variety of features, including grooves, pits, pegs, ridges ramps, and the like. Dies may also include combinations of features as specified by the needs of the user. As an example, a die might include several contiguous ridges so as to create a network of channels in the moldable material. Suitable dies are capable of applying up to about 30 tons of compression force to the moldable material residing within the sealable compression chamber.

Also disclosed are kits for analyzing analyte-containing samples. The kits typically include a thermoplastic microfluidic device having at least one microfluidic feature impressed into the thermoplastic microfluidic device. The microfluidic feature is typically characterized as having a dimension of less than about 100 micrometers.

The devices typically include a sample inlet that is in fluidic communication with an analysis region, which region typically includes at least one probe residing within the microfluidic feature, the probe being capable of specifically binding to an analyte. Oligonucleotides are considered suitable probes, as discussed elsewhere herein. The kits also include a supply of buffer, typically used as a vehicle to convey sample material through or within the thermoplastic microfluidic device of the kit.

Suitable thermoplastic fluidic devices are described elsewhere herein, as are suitable microfluidic features. Kits suitably also include a supply of a blocking agent, which agent can be included with the buffer. Suitable blocking agents prevent non-specific binding of the analyte-containing sample to at least a portion of the polymeric microfluidic device. Bovine serum albumin is considered a suitable blocking agent; other suitable blocking agents will be apparent to those having ordinary skill in the art. As one non-limiting example, a blocking agent, such as bovine serum albumin, is flowed within the device before introduction of a sample in order to prevent analyte molecules in a sample from adhering to any part of the interior of the device except to those regions that contain probes complementary to the analyte.

Typically, at least a portion of the thermoplastic microfluidic device is transparent to light or to at least a portion of the visible light spectrum. The polymeric microfluidic devices are typically constructed of thermoplastics having characteristics described elsewhere herein.

The devices also include one or more microfluidic features—such features are described elsewhere, and include, inter alia, channels, grooves, conduits, nubbins and the like. Kits also typically include one or more probes residing on or within a microfluidic feature Also disclosed are kits for cell lysing. The disclosed kits include a thermoplastic fluidic device, which device includes a sample loading inlet in fluidic communication with a lysing region, the lysing region being in fluidic communication with a filter, the filter being capable of fluidically communicating one or more analyte molecules to the molecule capture region, and the molecule capture region being in fluidic communication with both an elution inlet and an elution tip. The lysing region is typically capable of being heated to greater than 95° C. and pressurized to at least about 10 psi greater than the ambient atmospheric pressure to provide a lysed sample. The molecule capture region capable of being heated to at least about 40° C.

The kits also include one or more chaotropic materials suitable for disrupting a cell. Suitable chaotropic materials include urea, guanidinium chloride, guanidinium thiocyanate, or any acid or combination thereof. In a non-limiting embodiment, the kits allow contact between chaotropic material and a cell sample so as to allow the chaotropic material to lyse cells in the sample.

The polymeric microfluidic devices of the disclosed lysing kits are typically made from one or more thermoplastics. Suitable thermoplastics are described elsewhere herein.

The present invention also provides thermoplastic microfluidic analytical devices. Such devices include at least one microfluidic feature impressed in the thermoplastic microfluidic device, the microfluidic feature being characterized as having a dimension of less than about 100 micrometers.

The devices also include a sample inlet that is in fluidic communication with an analysis region of the device. The analysis region typically includes at least one probe capable of specifically binding an analyte, with the probe residing within the microfluidic feature.

Suitable probes are described elsewhere herein, and can include, inter alia, DNA sequences, proteins, and the like.

NON-LIMITING EXAMPLES AND REPRESENTATIVE EMBODIMENTS

The following examples are representative embodiments only and do not necessarily limit the scope of the present invention.

Example 1

Molding a Cyclic Polyolefin Workpiece

According the present invention, a workpiece is constructed from TOPAS™ COC 5013 resin by introducing the resin into a sealable compression chamber, where the resin conforms to the shape of the chamber. Once in the chamber, the resin compressed and is maintained at a temperature minimally below its liquidus point. The resin is then contacted with a die bearing a stencil of several channels, each channel having a width and height of less than about 50 micrometers, and the die is maintained in contact with the resin for a period of time sufficient for the resin to cool to or below its glass transition temperature. The resin is then cooled and removed from the compression chamber as a workpiece.

The bottom surfaces of the channels are modified with a chemical agent. Probes bearing specific sequences of DNA are then placed on the modified bottom surfaces and bind to the modified surfaces.

Example 2

Forming a Probe Array on a Cyclic Polyolefin Workpiece

Portions of the workpiece of Example 1 are coated at least in part with Clearweld™ radiation absorbing compound, the compound being applied proximate to each channel. A lid fabricated from TOPAS™ COC 6013 polymer is then contacted to the Clearweld™ and held in place by a compression force jig.

The compressed components are irradiated by a curtain of infrared light such that the radiation is absorbed by the Clearweld™ heats and softens and at least partially liquefies the interface between the workpiece sufficiently that the workpiece adheres to the lid and seals each channel. The resulting device is then capable of receiving and containing a fluid sample that contains one or more analytes complementary to the probes residing within the channels of the device. Such analytes are labeled with fluorescent or radioactive labels so as to facilitate the detection of the binding of any such analytes to complementary probes. Detection of the binding is performed by a visual scanner, photon multiplier tube, fluorometer, or other suitable device.

Example 3

Design, Production and Assembly of a Polymeric Microfluidic Microarray Chip

Another exemplary embodiment of the present invention includes the production of polymer microfluidic microarray devices. In this embodiment, a chip design is created using a computer automated design (CAD) program or other design method; chip designs include one or more channels. The model design is then used to create a mold for the compression injection molding of the device; methods for making molds from such designed are known to those having ordinary skill in the art.

After the mold is completed, including a molding cavity and also a compression die as described elsewhere herein, chips are formed using a horizontal or vertical compression molding apparatus. In this embodiment, the chips are fabricated by injecting a cyclic olefin copolymer (COC) which has been heated to its liquidus temperature. An example of such a temperature is approximately 400° C. The liquidus COC is then transferred to the compression molding cavity, where the compression die is actuated to apply a pressure of approximately 30 tons within the injection molding cavity.

During this period of time, which can be as short as approximately 600 milliseconds, the mold cavity is compressed by the molding apparatus to create a stand off pressure exceeding the 30 ton pressure present within the mold cavity, with the stand off pressure reaching approximately 100 tons. As this compression occurs, the injected polymer material begins to cool and take the form of the mold cavity, resulting in the formation of a polymer microfluidic chip formed according to the design and dimensions of the mold.

After this part is molded the polymer chip is functionalized to accept the deposition and binding of the biological macromolecule or probe, which, as discussed elsewhere herein, is a single stranded nucleic acid or protein. This functionalization process involves multiple steps to activate the surface, which is accomplished in some cases by using benzophenone in combination with UV light (365 nm).

After this step is complete, a functionalization chemistry, which is typically tri-silyl ethyl glycidyl molecules, is applied to the surface of the polymer chip and the polymer is again illuminated with UV light (365 nm) to displace the attached benzophenone. The polymer chip is then washed to remove excess and non-covalently bound glycidyl chemistry.

Once dried and cleaned, the polymer microfluidic chip is placed in a robotic spotting device, which in turn deposits probes into the microfluidic channels. The polymer chip is then placed for a period of time, such as 12-14 hours, in a humid chamber to allow for maximum binding of the probe molecule to the functionalized surface of the polymer chip.

After being spotted with several thousand probes, the polymer microfluidic chips are then sealed using a second layer of the COC polymer. This second layer is a film having a thickness less than 100 microns. Infrared-directed assembly then conducted using the described process of depositing Clearweld™ on the surface of the film, placing the two parts into contact with one another under a pressure between two transparent compression plates. The plates apply a pressure of approximately 300 psi.

While the lid and chips are contacted together under compression, a curtain of infrared light passes across the assembled components, the infrared light being absorbed by the Clearweld™, generating heat. The generated heat results in the melting of the COC material at the interface between the two pre-assembled components, and the parts bond by diffusion of the melted COC from the second layer into the polymeric chip, and vice versa. This infrared assembly step lasts for less than about 10 seconds, and does not cause warping or deformation of the polymeric microfluidic microarray chip or associated cover lid. The ultimate result is a uniform device without parting lines or weld interfaces.

Example 4

Design, Production and Assembly of a Polymeric Sample Preparation Device

The polymeric chip of Example 3 is molded, except that the polymeric chip does not include probe spots and has placed within it an olefin filter membrane and a PFTE valve before infrared-directed assembly, and the assembly is then performed according to Example 3. This embodiment produces a uniform device without parting lines or weld interfaces and also having the capability to filter and prepare cell material samples.

Example 5

Fabrication of a Combination Polymeric Sample Preparation Device and Microfluidic Detector Array The polymeric chip of Example 3 is molded, except that the polymeric chip has included within probe spots, an olefin filter membrane, and a PFTE valve, before infrared-directed assembly; the infrared-directed assembly is then performed according to Example 3. This embodiment produces an integrated, uniform device without parting lines or weld interfaces and having the capability to filter and prepare cell material samples and to also to detect biological or chemical species contained in the samples.

What is claimed:

1. A microfluidic workpiece, comprising:
   a microfluidic channel being impressed in the surface of a thermoplastic substrate,
   the microfluidic channel defining a depth and the microfluidic channel comprising a characteristic dimension in the range of from about 0.5 micrometers to about 100 micrometers,
   the microfluidic channel being adjacent to at least one secondary region, the secondary region defining a depth that is less than the depth of the microfluidic channel;
   a wall defining a boundary between the microfluidic channel and the secondary region; and
   at least one probe residing on a surface of the microfluidic channel;
   a radiation-absorbing compound residing in the secondary region, wherein the wall separates the radiation-absorbing compound from the microfluidic channel; and a thermoplastic member that is disposed above and opposite to the thermoplastic substrate and that at least partially overlaps the microfluidic channel of the thermoplastic substrate, the thermoplastic member being bonded to the thermoplastic substrate at the location of the radiation-absorbing compound.

2. The microfluidic workpiece of claim 1, wherein the wall comprises a characteristic dimension in the range of from about 0.5 micrometers to about 100 micrometers.

3. The microfluidic workpiece of claim 1, wherein the microfluidic channel comprises at least one roughened surface.

4. The microfluidic workpiece of claim 1, wherein the wall resides proximate to the microfluidic channel.

5. The microfluidic workpiece of claim 1, wherein the thermoplastic substrate is essentially transparent to light.

6. The microfluidic workpiece of claim 1, wherein the thermoplastic substrate is essentially transparent to at least a portion of the visible light spectrum.

7. The microfluidic workpiece of claim 1, wherein the thermoplastic substrate is essentially transparent to at least a portion of the infrared light spectrum.

8. The microfluidic workpiece of claim 1, wherein the thermoplastic substrate is essentially transparent to at least a portion of the ultraviolet light spectrum.

9. The microfluidic workpiece of claim 1, wherein the thermoplastic substrate is essentially transparent to light having a wavelength in the range of from 1 nm to about 1 mm.

10. The microfluidic workpiece of claim 1, wherein the thermoplastic substrate comprises a polyolefin, a cyclic olefin, a polyacrylic, a polystyrene, a polycarbonate, a polyimide, a polyacrylonitrile, a polyester, a polyarylamide, a polyamide, a polyetherketone, a polyvinyl halide, or any copolymer or combination thereof.

11. The microfluidic workpiece of claim 10, wherein the polyolefin comprises a polypropylene, a polyethylene, a cyclic polyolefin, a cyclic olefin, or any copolymer or combination thereof.

12. The microfluidic workpiece of claim 1, wherein the thermoplastic substrate comprises at least one cyclic molecule.

13. The microfluidic workpiece of claim 1, wherein the thermoplastic substrate comprises at least one bridged cyclic molecule.

14. The microfluidic workpiece of claim 1, further comprising at least one probe residing within a porous medium situated within the microfluidic channel.

15. The microfluidic workpiece of claim 14, wherein the porous medium is a polymer.

16. The microfluidic workpiece of claim 1, further comprising a filter in fluidic communication with the microfluidic channel, wherein the filter is capable of filtering molecules from a liquid sample.

17. The microfluidic workpiece of claim 16, wherein the filter is characterized as having a nominal pore size of less than about 2 microns.

18. The microfluidic workpiece of claim 16, wherein the filter is characterized as having a nominal pore size in the range of from about 0.02 microns to about 2 microns.

19. The microfluidic workpiece of claim 16, wherein the filter is characterized as having a nominal pore size in the range of from 0.2 microns to about 0.5 microns.

20. The microfluidic workpiece of claim 1, the thermoplastic member having, as compared to the thermoplastic substrate, one or more of: a higher Tg, a higher deflection temperature under load, or a lower melt volume rate.

21. The microfluidic workpiece of claim 1, wherein the microfluidic channel comprises a characteristic dimension in the range of from about 0.5 micrometers to less than 5 micrometers.

22. A microfluidic workpiece, comprising:
a microfluidic channel being impressed in the surface of a thermoplastic substrate,
the microfluidic channel defining a depth and the microfluidic channel comprising a characteristic dimension in the range of from about 0.5 micrometers to about 100 micrometers,
the microfluidic channel being adjacent to at least one secondary region,
a wall defining a boundary between the microfluidic channel and the secondary region;
at least one probe residing on a surface of the microfluidic channel; and
a radiation-absorbing compound residing in the secondary region, wherein the wall separates the radiation-absorbing compound from the microfluidic channel; and
a thermoplastic member that is disposed above and opposite to the thermoplastic substrate and that at least partially overlaps the microfluidic channel of the thermoplastic substrate, the thermoplastic member being bonded to the thermoplastic substrate at the location of the radiation-absorbing compound.

23. The microfluidic workpiece of claim 22, wherein the secondary region comprises a trench.

* * * * *